United States Patent [19]

Lowrance et al.

[11] Patent Number: 4,759,469
[45] Date of Patent: Jul. 26, 1988

[54] APPARATUS AND METHOD FOR INJECTING BALLS INTO A WELL

[75] Inventors: Dan E. Lowrance; Donald L. Douglas, both of Fort Worth; David W. Merryfield, Mansfield, all of Tex.

[73] Assignee: Special Projects Mfg., Inc., Fort Worth, Tex.

[21] Appl. No.: 926,182

[22] Filed: Nov. 3, 1986

[51] Int. Cl.$^4$ ............................................ B65G 29/00
[52] U.S. Cl. .................................. 221/75; 29/434; 29/456; 29/156.8 R; 198/467.1; 198/670; 221/281; 221/197
[58] Field of Search ............. 221/75, 76, 97, 98, 221/281, 287, 197; 29/434, 456, 156.8; 198/467.1, 670

[56] References Cited

U.S. PATENT DOCUMENTS

| | | | |
|---|---|---|---|
| 64,886 | 5/1867 | Little | 198/670 |
| 1,702,554 | 2/1929 | Walker | 221/75 |
| 2,515,404 | 7/1950 | Grosvenor | 198/670 |
| 2,620,061 | 12/1952 | Uxa | 221/281 |
| 2,627,140 | 2/1953 | Marzolf | 198/467.1 |
| 2,933,136 | 4/1960 | Ayers et al. | 166/42 |
| 2,987,170 | 6/1961 | Hamilton | 198/213 |
| 3,178,055 | 4/1965 | Schuller | 221/197 |
| 3,372,705 | 3/1968 | Bodhaine | 137/268 |
| 3,715,055 | 2/1973 | Kendrick et al. | 221/75 |
| 3,815,781 | 6/1974 | Armstrong et al. | 221/75 |
| 3,895,678 | 7/1975 | Wright et al. | 166/284 |
| 4,111,334 | 9/1978 | Winn, Jr. et al. | 221/75 |
| 4,132,243 | 1/1979 | Kuus | 137/268 |
| 4,187,909 | 2/1980 | Erbstoesser | 166/284 |
| 4,600,119 | 7/1986 | Olson | 221/197 |

Primary Examiner—H. Grant Skaggs
Attorney, Agent, or Firm—James E. Bradley

[57] ABSTRACT

This invention is an apparatus for dispensing balls and a method of loading balls into the apparatus. The apparatus has a housing, a shaft, and a helical rib mounted on the shaft. Rods are mounted in the housing, between the rib and the housing, to keep the balls from rolling down the rib. As the shaft and the rib are rotated, the balls are pushed out the lower end of the housing. A cylindrical loading sleeve fits over the shaft, the rib, and the rods. The balls are loaded onto the rib through a longitudinal slot in the side of the sleeve. The sleeve is then placed on the housing, and the shaft, rib, rods, and balls are lowered into the housing.

3 Claims, 5 Drawing Sheets

APPARATUS AND METHOD FOR INJECTING BALLS INTO A WELL

BACKGROUND OF THE INVENTION

1. Field of the Invention

This invention relates in general to a method and apparatus for dispensing objects. In particular, the invention relates to a method and apparatus for injecting spherical sealer balls into an oil well.

2. Description of the Prior Art

When an oil or gas well is completed, it is common practice to cement the well casing into the well. The casing is then perforated to allow fluid from the producing formations to flow into the well bore.

In order to increase the productivity of oil and gas wells, producing formations are sometimes treated by hydraulic fracturing and acidizing. Hydraulic treating fluid is pumped into the well bore and exits through the perforations in the casing into the formation.

If some of the perforations are blocked by sediment, or if part of a formation has a lower permeability, part of the formation may not be treated. To insure that this does not happen, perforation sealer balls are introduced into the treating fluid. The sealer balls seal the open perforations, thus forcing the treating fluid to flow through the other perforations.

Several different types of methods and devices have been devised for injection sealer balls into a well. These devices must be capable of withstanding the high pressures of the well bore. The devices must also be able to easily and accurately count the number of balls inserted into the well. Sometimes several hundred balls are used, so it is sometimes very difficult to keep up with how many balls have been inserted.

Some prior art ball injectors resemble heavy duty gum ball machines, with complicated mechanisms. The complexity of such machines make them expensive to manufacture and difficult to use and to maintain.

U.S. Pat. No. 3,715,055 (Kendrick et al.) shows a ball injector which has a housing, a rotatable shaft having a helical rib, and a sleeve having a spiral groove. The groove and the rib have different pitches, so they form separate compartments in which the balls are carried. As the shaft is rotated, the balls are forced downward out of the housing. The device is loaded by inverting the housing, dropping balls into the outlet, and rotating the shaft in the opposite direction.

U.S. Pat. No. 4,111,334 (Winn, Jr., et al.) shows a similar ball injector. This device has a housing, a stationary shaft having a spiral groove, and a rotatable sleeve having a helical rib. The sleeve is rotated to move the balls along the shaft. The device is loaded by inserting balls into the top of the device and rotating the sleeve in the normal direction.

Although these devices perform their intended function, the spiral groove makes them expensive to manufacture. It would also be desirable to be able to load the devices more quickly, and to have a simple way to keep a count of the number of balls which have been loaded.

SUMMARY OF THE INVENTION

The apparatus of the invention is for dispensing spherical sealing balls. The apparatus includes a housing having a smooth, cylindrical inner surface. A shaft, having a smooth, cylindrical outer surface, is coaxially mounted within the housing. The distance between the outer surface of the shaft and the inner surface of the housing is greater than the diameter of the balls, so that the balls will fit between the two surfaces.

A helical rib is mounted on the outer surface of the shaft. One or more rods, preferably four, are mounted within the housing, between the rib and the housing. The distance between the rods and the shaft is less than the diameter of the balls, so that the balls cannot roll down the rib.

The shaft and rib are rotated while the rods remain stationary to force the balls downward and out of the housing. Preferably, the shaft and the rib are rotated by a crank on top of the housing.

The apparatus of the invention also includes a cylindrical loading sleeve. The loading sleeve can be placed down over the shaft, the rib, and the rods. The balls can then inserted into the loading sleeve through a longitudinal slot in the side of the sleeve.

The method of the invention involves using the loading sleeve to load the balls into the device. The rods, the shaft, and the rib are removed from the housing. The loading sleeve is then placed over the rods, the shaft, and the rib. The loading sleeve has a longitudinal slot which has a width which is slightly greater than the diameter of the balls, so that the balls can be inserted through the slot.

After a column of balls has been inserted against one of the rods, the loading sleeve is rotated, so that the sleeve holds the balls in place. Then a second column of balls can be inserted against another rod.

After all of the balls have been inserted, the loading sleeve is placed on top of the housing. The rods, the shaft, the rib, and the balls are then lowered into the housing.

DESCRIPTION OF THE PREFERRED EMBODIMENT

Figure 1A:
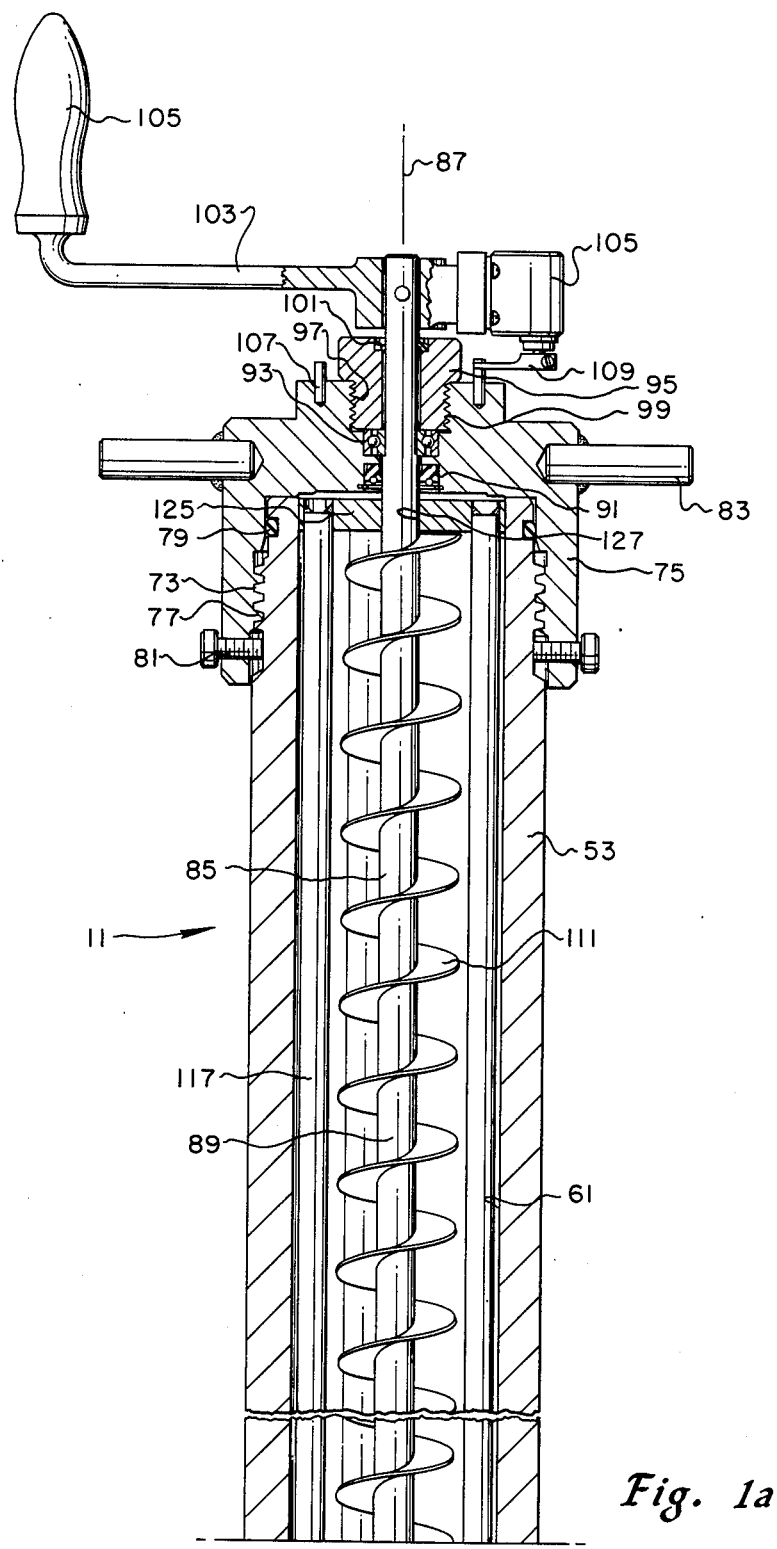
FIGS. 1a and 1b together are a sectional view of a ball injector of the invention.
Figure 1B:
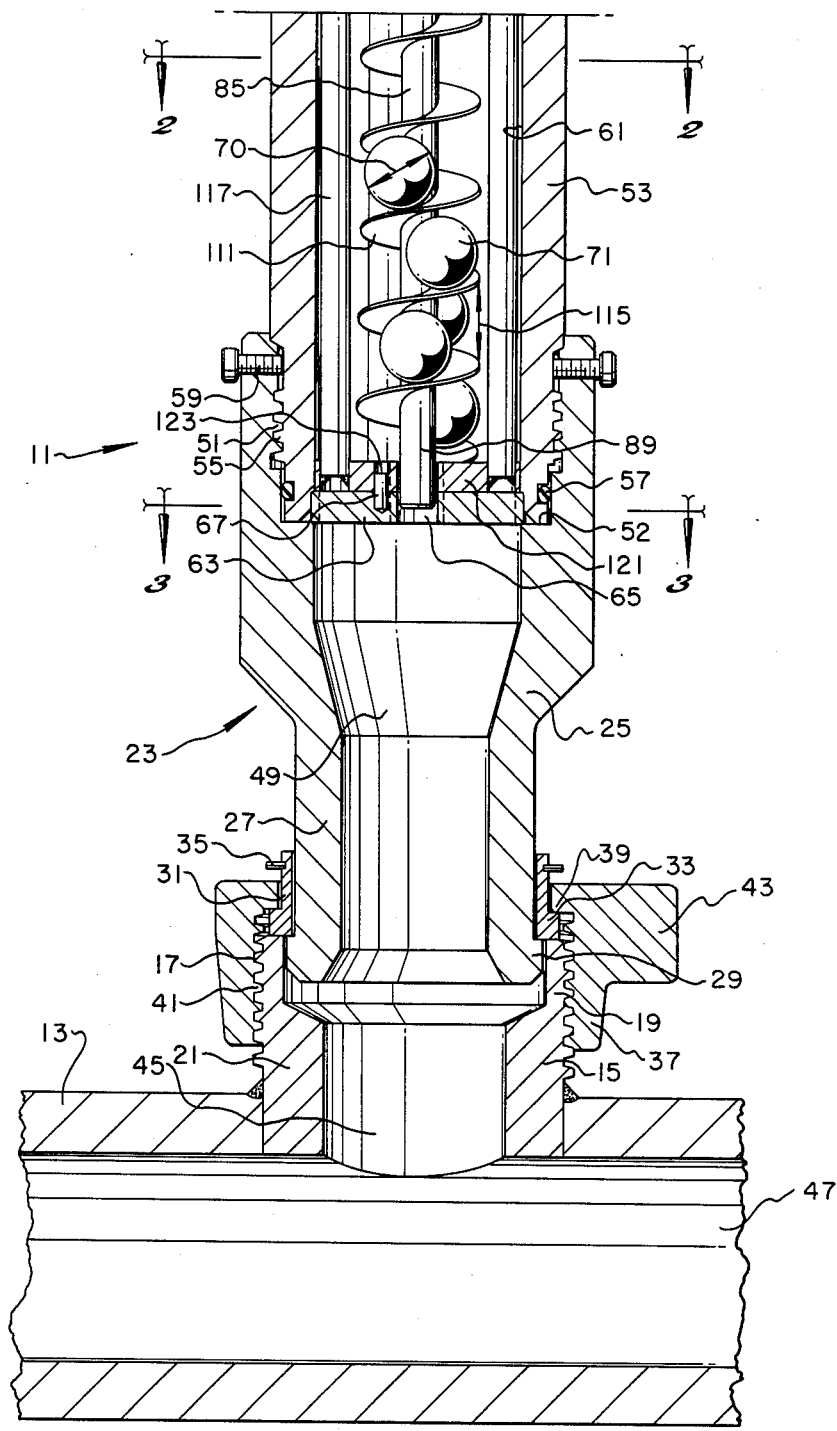

FIGS. 1a and 1b show a ball injector constructed according to the apparatus of the invention. The ball injector 11 is connected to a flow line 13, which leads to the bore hole of the well (not shown).

The flow line 13 has an upwardly extending tee 15, which has external threads 17. The upper section 19 of the tee 15 has an inner diameter which is larger than the inner diameter of the lower section 21 of the tee 15.

The lower end of the ball injector 11 is a generally cylindrical nose 23, having an upper section 25 and a lower section 27. The lower section 27 of the nose 23 has a smaller outside diameter, and an outwardly extending lip 29. The lip 29 has a diameter which is slightly smaller than the inner diameter of the upper section 19 of the tee 15, so that the lip 29 and the lower section 27 of the nose 19 fit within the tee 15.

Three ring sections 31 fit around the lower section 27 of the nose 23, above the outwardly extending lip 29. These ring sections 31 also have an outwardly extending lip 33 on the lower end. A retainer ring 35 is located near the upper end of the ring sections 33.

A nut 37 connects the ball injector 11 to the tee 15. The nut 37 has an inwardly extending shoulder 39, which contacts the outwardly extending lip 33 on the ring sections 31. The nut 37 also has threads 41 which engage the threads 17 on the tee 15. The ball injector 11 can be removed from the tee 15 by unthreading the nut 37. A lug 43 on the nut 37 facilitates the threading and unthreading of the nut 37.

The tee 15 has bore 45 which intersects the bore 47 of the flow line 13. The cylindrical nose 23 also has a bore 49, which is in fluid communication with the bore 45 of the tee 15 and the bore 47 of the flow line 13. The bore 49 of the nose 23 tapers, so that the bore 49 has a larger diameter in the upper section 25 of ther nose 23 than in the lower section 27.

Near the upper end of the nose 23, the bore 49 abruptly enlarges, forming an upwardly facing shoulder 49. Above this shoulder 49, the nose 23 has internal threads 51.

Above the nose 23, the ball injector 11 has a cylindrical housing 53. The lower end of the housing 53 abuts the shoulder 52 in the nose 23, and has external threads 55, which engage the internal threads 51 in the upper end of the nose 23. An O-ring seal 57 seals between the housing 53 and the nose 23. Two set screws 59 extend through the nose 23 and engage the housing 53, to hold the housing 53 against unthreading from the nose 23.

Figure 3:
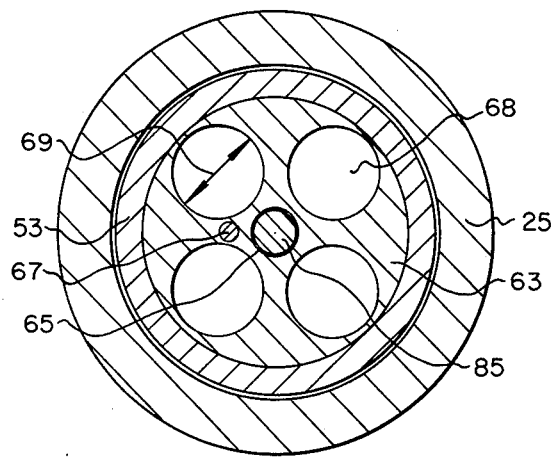
FIG. 3 is a sectional view of the ball injector of the invention, as seen along line 3—3 in FIG. 1b.

The housing 53 is a hollow cylinder, having a smooth, cylindrical inner surface 61. A bottom plate 63 is welded onto the lower end of the housing 53. A circular hole 65 is located in the center of the bottom plate 63. The bottom plate 63 also has an upwardly extending retainer pin 67, located near the center hole 65. As shown in FIG. 3, the bottom plate 63 also has four circular holes 68, equally spaced around the bottom plate 63. The diameter 69 of these holes 68 is slightly larger than the diameter 70 of the balls 71, shown in FIG. 1b.

The upper end of the housing 53, shown in FIG. 1a, also has external threads 73. The upper end of the housing 53 is closed by a lid 75, which has internal threads 77 to engage the threads 73 on the housing 53. An O-ring seal 79 seals between the lid 75 and the housing 53, and two set screws 81 hold the lid 75 against unthreading from the housing 53. A pair of lugs 83 are provided to facilitate the threading and unthreading of the lid 75. One of the lugs 83 shown in FIG. 1a is shown ninety degrees out of its true position.

Figure 2:
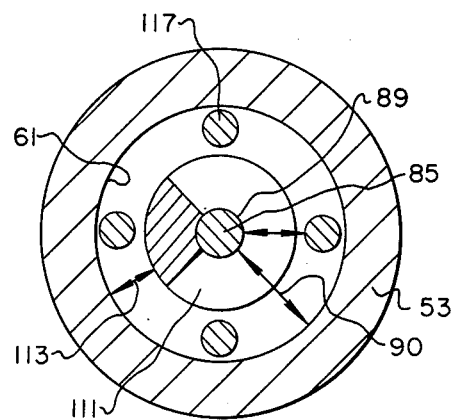
FIG. 2 is a sectional view of the ball injector of the invention, as seen along line 2—2 in FIG. 1b.

A shaft 85 is mounted coaxially within the housing 53, so that the housing 53 and the shaft 85 have the same longitudinal axis 87. The shaft 85 has a smooth, cylindrical outer surface 89, and the lower end of the shaft 85 fits within the circular hole 65 in the bottom plate 63 of the housing 53. As best shown in FIG. 2, the distance 90 between the inner surface 61 of the housing 53 and the outer surface 89 of the shaft 83 is greater than the diameter 70 of the balls 71, so the balls 71 can fit between the shaft 83 and the housing 53.

The upper end of the shaft 85 extends upward through the lid 75. Packing 91 seals between the shaft 85 and the lid 75, and a bearing 93 allows the shaft 85 to rotate relative to the housing 53.

The shaft 85 also extends upwardly through a cap 95, which is threaded onto the lid 75. The cap has external threads 97, which engage internal threads 99 on the lid 75. A seal 101 seals between the shaft 85 and the cap 95.

A crank 103 is attached to the upper end of the shaft 85. A handle 105 is provided on the end of the crank 103 to facilitate the manual rotating of the crank 103 and the shaft 85.

A counter 105 is mounted on the crank 103 in order to automatically count the number of balls 71 which are dispensed from the ball injector 11. Four roll pins 107 are mounted on top of the lid 75, equally spaced around the cap 95. As the crank 103 is turned, a swing arm 109 on the counter 105 contacts the roll pins 107 in turn. The counter 105 counts one ball 71 each time the swing arm 109 contacts a roll pin 107.

A helical rib 111 is rigidly mounted on the outer surface 89 of the shaft 85. The rib 111 spirals downward to the right, so that when the crank 103 is rotated counterclockwise, the rib 111 will move the balls 71 downward. The distance 113 between the outer edge of rib 111 and the inner surface 61 of the housing 53, as shown in FIG. 2, is smaller than the diameter 70 of the balls 71. This keeps the balls 71 from falling between the rib 111 and the housing 53. As shown in FIG. 1b, the pitch 115 of the rib 111 is slightly larger than the diameter 70 of the balls 71, so that the balls 71 fit within the rib 111.

Also located within the housing 53 are four cylindrical rods 117. As shown in FIG. 2, the rods 117 are equally spaced around and parallel with the shaft 85. In the embodiment shown, the rods 117 are cylindrical. The distance 119 between the inner sides of the rods 117 and the outer surface 89 of the shaft 85 is smaller than the diameter 70 of the balls 71. Thus, the rods 117 keep the balls 71 from rolling around the shaft 85 down the rib 111.

The lower ends of the rods 117 are welded into a lower guide plate 121, shown in FIG. 1b. The lower guide plate 121 has a small hole 123, into which the retainer pin 67 on the bottom plate 63 of the housing 53 fits. The retainer pin 67 thus aligns the lower guide plate 121 and holds the rods 117 against rotation about the longitudinal axis 87 of the housing 53.

The upper ends of the rods 117 are welded into an upper guide plate 125, shown in FIG. 1a. The shaft 85 extends through a circular hole 127 in the upper guide plate 125.

When the ball injector 11 is being used to insert balls 71 into the flow line 13, the ball injector 11 is mounted on the tee 15 as shown in FIGS. 1a, 1b, 2, and 3. The balls 71 are contained in the housing 53 in four vertical columns, one column being against each rod 117. The balls 71 in each column are separated by the threads of the rib 111.

As the crank 103 is turned counterclockwise, the rib 111 rotates, and pushes the balls 71 downward. As each ball 71 reaches the bottom plate 63, the ball 71 falls through one of the holes 68 in the bottom plate 63, through the bore 49 of the nose 23 and the bore 45 of the tee 15, into the bore 47 of the flow line 13. Each time a ball 71 is released, the swing arm 109 on the counter 105 contacts a roll pin 107 and counts the ball 71.

Figure 4:
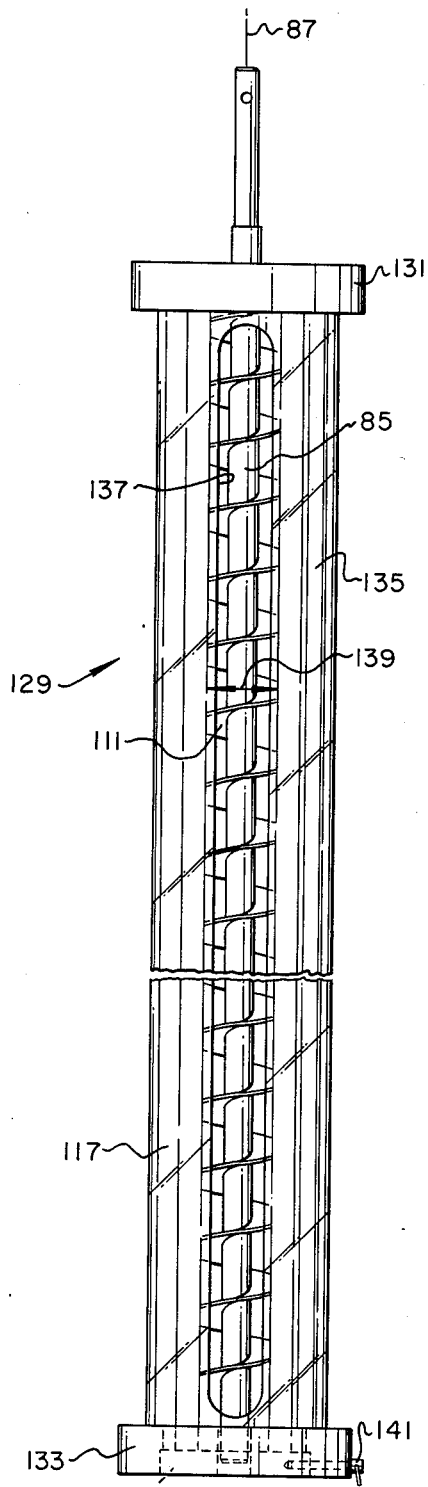
FIG. 4 is a side view of the loading sleeve, the shaft, and the rods, ready for loading.
Figure 5A:
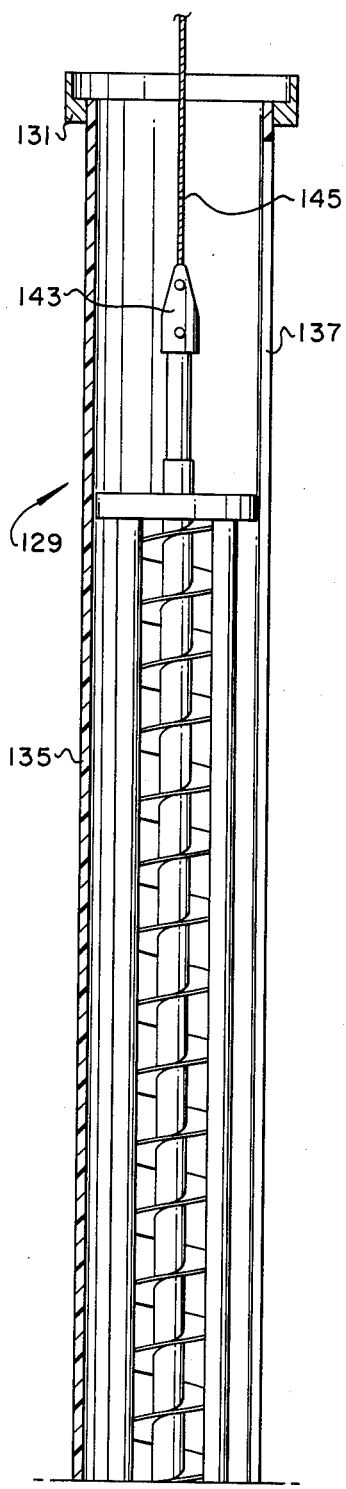
FIGS. 5a and 5b together are a side view, partially in section, of the ball injector, during the loading operation.
Figure 5B:
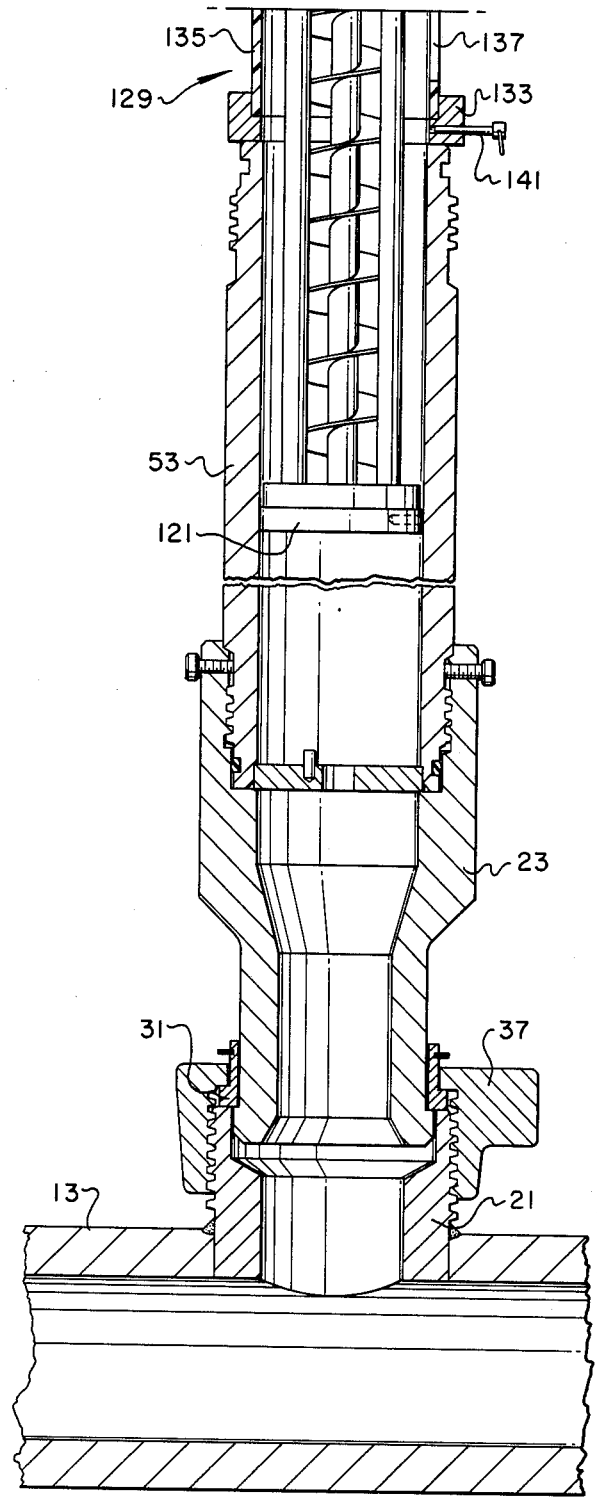

FIGS. 4, 5a, and 5b illustrate the method of loading the ball injector 11. A loading sleeve 129 is used to load the balls 71 into the device. The loading sleeve 129 has an upper ring 131 and a lower ring 133, separated by a hollow, cylindrical sleeve 135. The sleeve 135 is made of a transparent material, so that the balls 71 inside the sleeve 135 can be seen. The inner diameter of sleeve 135 is substantially the same as the inner diameter of housing 53. The sleeve 135 has a straight longitudinal slot 137, which extends almost the entire length of the sleeve 135 parallel with the axis of sleeve 135. The length of slot 137 is substantially the height of the rib 111, so that each turn or thread of the rib 111 is exposed to the slot. The width 139 of the slot 137 is slightly larger than the diameter 70 of the balls 71.

To load the ball injector 11, first the crank 103 is removed from the shaft 85. Then, the set screws 81 are loosened, and the lid 75 is unthreaded from the housing 53. The subassembly comprising the shaft 85, rib 111, rods 117 and the upper and lower guide plates 121, 125 is then lifted from the housing 53. The removable lid 75 and the engagement of plate 121 with plate 63 by means of pin 67 serve as means for allowing the subassembly comprising shaft 85, rib 11, rods 117 and the upper and lower guide 121, 125 to be pulled upward from the housing 53.

The loading sleeve 129 is then placed over the shaft 85 and the rods 117, as shown in FIG. 4. A retaining pin 141 located in the lower ring 133 is pushed inwardly to the shaft 85 and rib 111 from falling through the open lower end of the loading sleeve 129.

The sleeve 129 is rotated to position two of the rods 116 on each side of the slot 137. One column of balls 71 can then be loaded through the slot 137, with one ball 71 being placed between each thread of the rib 111 and between two of the rods 117. The loading sleeve 129 can then be rotated ninety degrees, and a second column of balls 71 can be loaded. As the second column is being loaded, the sleeve 135 holds the previously loaded balls 71 in place. The third and fourth columns are loaded in the same manner.

After the fourth column of balls 71 has been loaded, the loading sleeve 129 is rotated about twenty degrees to position one of the rods 117 behind the slot 137, so that the sleeve 129 holds all of the balls 71 in place. The loading sleeve 129 can then be handled without fear of spilling the balls 71.

The loading sleeve 129 is then placed on top of the housing 53, as shown in FIGS. 5a and 5b. A connector 143, attached to a cable 145, is then connected to the shaft 85. The retaining pin 141 is pulled outwardly from the lower guide plate 121, and the shaft 85, the rods 117, the upper and lower guide plates, 121, 125, and the balls 71 are lowered into the housing 53.

The lower guide plate 121 reaches the bottom plate 63 of the housing 53, and the hole 123 in the lower guide plate 121 fits down over the retaining pin 67. The connector 143 and the cable 145 are removed from the shaft 85, and the loading sleeve 129 is removed from the top of housing 53. The lid 75 is replaced on the housing 53. The set screws 81 are tightened, and the crank 103 is replaced on the shaft 85. The apparatus is now ready to inject the balls 71.

Figure 6:
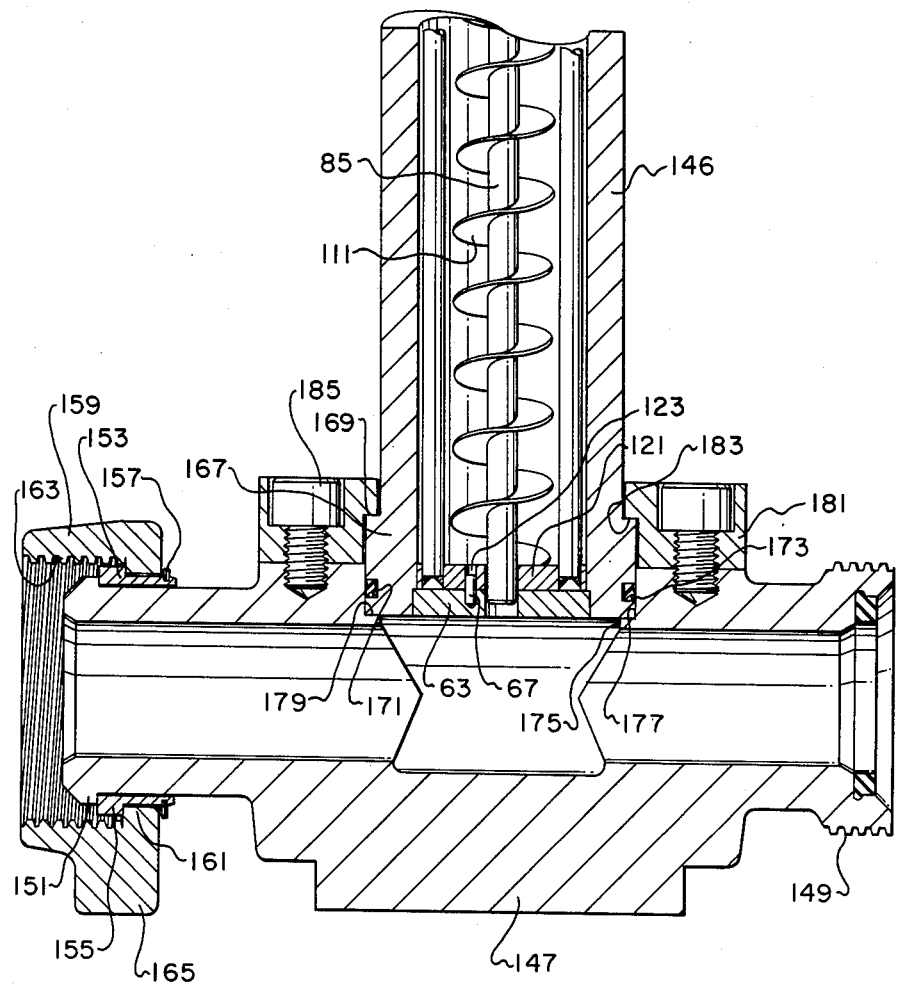
FIG. 6 is a sectional view of an alternate embodiment of the connection between the housing and the flow line.

FIG. 6 illustrates a different way to connect the housing 146 to the flow line (not shown). In this embodiment, there is no tee, but the housing 146 is placed directly onto a base 147.

The base 147 has external threads 149 on one end for connection to the flow line (not shown). At the other end, the base 147 has an outwardly extending lip 151. Three ring sections 153 fit around the end of the base 147, within the outwardly extending lip 151. These ring sections 153 also have an outwardly extending lip 155 on the end. A retainer ring 157 is located near the other end of the ring sections 153.

A wing nut 159 connects the base 147 to the flow line (not shown). The nut 159 has an inwardly extending shoulder 161, which contacts the outwardly extending lip 155 on the ring sections 153. The nut 159 also has threads 163 which engage the threads on the flow line (not shown). The base 147 can be removed from the flow line (not shown) by unthreading the nut 159. A lug 165 on the nut 159 facilitates the threading and unthreading of the nut 159.

In this embodiment, the housing 146 has a section 167 at the lower end, which has a larger outside diameter than the remainder of the housing 146, thus forming an upwardly facing shoulder 169. This lower section 167 also has a seal groove 171, in which a seal 173 is located.

The base 147 has a circular opening 175, which is smaller than the diameter of the lower section 1767 of the housing 146. Concentric with that opening 175 is a larger opening 177, with a diameter slightly larger than the diameter of the lower section 167 of the housing 146. The housing 146 can thus be inserted into the larger opening 177 and rest upon the a shoulder 179 formed above the other opening 175. The seal 173 in the seal groove 171 seals between the lower section 167 of the housing 146 and the base 147.

The housing 146 is secured to the base 147 by a flange 181. The flange encircles the housing 146 and has a downward facing shoulder 183, which engages the upward facing shoulder 169 on the housing 146. The flange 181 is locked onto the base 147 by ten socket head cap screws 185.

The ball injector 11 of the invention has several advantages over the prior art. One advantage is that the shaft 85 can be removed from the housing 53, and the balls 71 can be loaded much faster. For example, one shaft 85 could be removed and a second preloaded shaft 85 could be lowered into the housing 53 in a matter of minutes, rather than inserting the balls 71 into the top or bottom of the housing 53 one at a time while turning the crank 103.

Another advantage is that the transparent sleeve 135 allows the balls 71 to be counted even after the balls 71 have been loaded. In prior art devices, the balls 71 must be counted as they are loaded.

Still another advantage is ease of manufacture. Prior art devices have grooves or recesses in the bore of the housing, which are difficult and expensive to cut. The rods 117 of the invention are much easier and faster to produce.

The embodiment shown in FIG. 6 has at least one advantage over the other embodiment. In the second embodiment, the balls are injected more directly into the flow in the flow line. The balls are thus more likely to be properly inserted into the well.

The invention has been shown only in its preferred embodiment. It should be apparent that there are other ways to practice the invention.

We claim:
1. An apparatus for loading and dispensing balls, comprising:
   a housing, having a smooth, cylindrical inner surface;
   a shaft, having a smooth, cylindrical outer surface, coaxially and rotatably mounted in the housing, wherein the distance between the outer surface of the shaft and the inner surface of the housing is greater than the diameter of the balls;

a helical rib, mounted on the outer surface of the shaft, wherein the distance between the rib and the inner surface of the housing is less than the diameter of the balls, so that the balls cannot fall between the rib and the inner surface of the housing;

a plurality of rods, mounted within the housing between the rib and the inner surface of the housing, equally spaced around the rib and parallel with the shaft, wherein the distance between the rod and the outer surface of the shaft is less than the diameter of the balls, so that the balls cannot roll down the rib;

rotation means for rotating the shaft and the rib about the longitudinal axis of the shaft while the rods remain stationary, to move the balls through the housing;

the rods, the shaft, and the rib being mounted together in a subassembly;

means for allowing the subassembly to be pulled upwardly from the housing for loading; and a loading sleeve adapted to receive the subassembly one withdrawn from the housing, the loading sleeve having a longitudinal slot extending substantially the height of the rib, the slot having a width which is greater than the diameter of the balls, so that the balls can be inserted through the slot, the loading sleeve and subassembly being rotatable relative to each other to allow balls to be inserted through the slot onto the rib in all of the spaces between the rods.

2. An apparatus for loading and dispensing balls, comprising:

a housing, having a smooth, cylindrical inner surface;

a shaft, having a smooth, cylindrical outer surface, coaxially and removably mounted in the housing, wherein the distance between the outer surface of the shaft and the inner surface of the housing is greater than the diameter of the balls;

a helical rib, mounted on the outer surface of the shaft, wherein the distance between the rib and the inner surface of the housing is less than the diameter of the balls, so that the balls cannot fall between the rib and the inner surface of the housing;

a plurality of rods, mounted within the housing between the rib and the inner surface of the housing, equally spaced around the rib and parallel with the shaft, wherein the distance between the rod and the outer surface of the shaft is less than the diameter of the balls, so that the balls cannot roll down the rib;

rotation means for rotating the shaft and the rib about the longitudinal axis of the shaft, to move the balls through the housing;

a cylindrical loading sleeve, which is adapted to fit over the rods, the shaft, and the rib, the loading sleeve having an inner diameter that is substantially the same as the housing and a longitudinal slot that extends substantially the height of the rib, the slot having a width which is greater than the diameter of the balls, so that the balls can be inserted through the slot, the loading sleeve being rotatable about the longitudinal axis of the shaft relative to the rods;

the shaft, rib, and rods being mounted in a subassembly; and means for pulling the subassembly upwardly from the housing and inserting it into the loading sleeve for loading, and for lowering the subassembly downwardly from the loading sleeve into the housing once the balls are loaded.

3. A method of loading balls into an apparatus for dispensing the balls, the method comprising the steps of:

providing the apparatus with a housing and a removable subassembly including a helical rib mounted on a shaft, a plurality of rods spaced in a circular array around the rib, the ribs and rods being rotatable relative to each other;

providing a cylindrical loading sleeve that is adapted to receive the subassembly when withdrawn from the housing, and providing the loading sleeve with an elongated slot extending downwardly along its length;

placing the subassembly within the loading sleeve;

inserting balls through the slot onto the ribs in the spaced between the rods;

rotating the loading sleeve to position one of the rods behind the slot so that the sleeve holds the balls in place;

placing the loading sleeve in axial alignment with and on top of the housing;

moving the subassembly and the balls into the housing; and then removing the loading sleeve from the housing.

* * * * *